(12) United States Patent
Torrent (10) Patent No.: US 10,268,939 B2
(45) Date of Patent: Apr. 23, 2019

(54) SYSTEMS AND METHODS FOR AN AUTOMATED, NEAR REAL-TIME, AND MOBILE IDENTIFICATION AND LOCALIZATION APPROACH WITH A COMBINATION OF BATTERY-LESS IDENTIFICATION MARKING TECHNOLOGIES AND PSEUDO RANGE-FREE LOCALIZATION ALGORITHMS

(71) Applicants: ARIZONA BOARD OF REGENTS ON BEHALF OF ARIZONA STATE UNIVERSITY, Tempe, AZ (US); David Grau Torrent, Tempe, AZ (US)

(72) Inventor: David Grau Torrent, Tempe, AZ (US)

(73) Assignee: ARIZONA BOARD OF REGENTS ON BEHALF OF ARIZONA STATE UNIVERSITY, Tempe, AZ (US)

( * ) Notice: Subject to any disclaimer, the term of this patent is extended or adjusted under 35 U.S.C. 154(b) by 0 days.

(21) Appl. No.: 15/568,074

(22) PCT Filed: Apr. 22, 2016

(86) PCT No.: PCT/US2016/028915
§ 371 (c)(1),
(2) Date: Oct. 20, 2017

(87) PCT Pub. No.: WO2016/172529
PCT Pub. Date: Oct. 27, 2016

(65) Prior Publication Data
US 2018/0121777 A1    May 3, 2018

Related U.S. Application Data

(60) Provisional application No. 62/151,034, filed on Apr. 22, 2015.

(51) Int. Cl.
*G06K 19/07* (2006.01)
*G06Q 10/06* (2012.01)
(Continued)

(52) U.S. Cl.
CPC ......... *G06K 19/0723* (2013.01); *G06Q 10/06* (2013.01); *G06Q 10/08* (2013.01);
(Continued)

(58) Field of Classification Search
CPC .... G06K 19/0273; G06Q 10/06; G06Q 10/08; G06Q 50/28
See application file for complete search history.

(56) References Cited

U.S. PATENT DOCUMENTS 6,496,806 B1 * 12/2002 Horwitz ............. G06K 17/0029
340/10.1
2005/0071234 A1 * 3/2005 Schon .................... G06Q 10/08
705/22

(Continued)

FOREIGN PATENT DOCUMENTS

KR    20100074722 A    7/2010

OTHER PUBLICATIONS

International Preliminary Report on Patentability issued in corresponding Application No. PCT/US2016/028915, dated Oct. 24, 2017, 10 pages.

*Primary Examiner* — Omar Casillashernandez
(74) *Attorney, Agent, or Firm* — Polsinelli PC (57) ABSTRACT

Embodiments of an automated and mobile identification and localization system and method for tracking both the final (stationary) and intermediate (transient) location of non-bulk resources and components are disclosed.

13 Claims, 5 Drawing Sheets

(51) Int. Cl.
    *G06Q 50/28*     (2012.01)
    *G06Q 10/08*     (2012.01)
    *G01S 19/01*     (2010.01)
    *G06K 17/00*     (2006.01)

(52) U.S. Cl.
    CPC .............. *G06Q 50/28* (2013.01); *G01S 19/01* (2013.01); *G06K 2017/0045* (2013.01); *Y04S 10/54* (2013.01)

(56) References Cited

U.S. PATENT DOCUMENTS

| | | | |
|---|---|---|---|
| 2006/0208890 A1* | 9/2006 | Ehrman | G06Q 10/08 340/572.1 |
| 2007/0282482 A1* | 12/2007 | Beucher | G06Q 10/08 700/225 |
| 2008/0068170 A1* | 3/2008 | Ehrman | G06Q 10/08 340/572.1 |
| 2009/0212915 A1* | 8/2009 | Ulrich | G06K 17/0022 340/10.1 |
| 2014/0074667 A1 | 3/2014 | Smith | |
| 2015/0347840 A1* | 12/2015 | Iida | H04N 13/271 382/103 |

\* cited by examiner

SYSTEMS AND METHODS FOR AN AUTOMATED, NEAR REAL-TIME, AND MOBILE IDENTIFICATION AND LOCALIZATION APPROACH WITH A COMBINATION OF BATTERY-LESS IDENTIFICATION MARKING TECHNOLOGIES AND PSEUDO RANGE-FREE LOCALIZATION ALGORITHMS

CROSS-REFERENCE TO RELATED APPLICATIONS

This is a non-provisional application that claims benefit to U.S. provisional application Ser. No. 62/151,034, filed on Apr. 22, 2015, which is herein incorporated by reference in its entirety.

FIELD

The present disclosure generally relates to systems and methods for battery-less identification marking technologies to track the position of resources through their movement with a mobile (without fixed infrastructure of hardware assets) and near real-time approach, and in particular to non-bulk resources and components tracking system utilizing a novel combination of battery-less identification marking technologies, positioning services, and pseudo-range free localization algorithms.

BACKGROUND

The automated and precise location of non-bulk resource and components (e.g. engineered components, military supplies, cars, or general inventory items) in large, rough, or frequently unpredictable scenarios (such as those of civil engineering projects, war zones, car distribution, inventory management, etc.) is a challenging problem. In such scenarios, it is fundamental to be capable of exactly locating the components, so the right component is available for use by downstream processes at the right time and right place. For instance, the inability to locate a bolting tool or a prefabricated component required for installation on a project site have been observed to leave crane equipment and crews idle for several hours or even a full day. Similarly, the inability to locate a car in a common inventory and distribution yard also requires multiple hours, sometimes days, by crews. There is a need to properly and efficiently locate non-bulk resources or components over small or large areas (sometimes tens or hundreds of acres) in unpredictable, non-controlled, or dynamic scenarios.

Traditional manual tracking of resources and components tends to be time consuming, error prone, and inefficient. The solution needs an adequate blending of advanced technologies and reasoning mechanisms to facilitate the location of multiple, even thousands, resources/components over extensive areas in short amounts of time and at inexpensive costs. Battery-less identification marking technologies are characterized by the data communication between a powered transmitter/receiver unit (also referred as transmitter, receiver, or reader) and a battery-less electronic identification device (typically referred as tag) through electromagnetic energy waves (e.g. radio waves). An example of such battery-less identification marking technologies is passive radio frequency identification (RFID).

Figure 1:
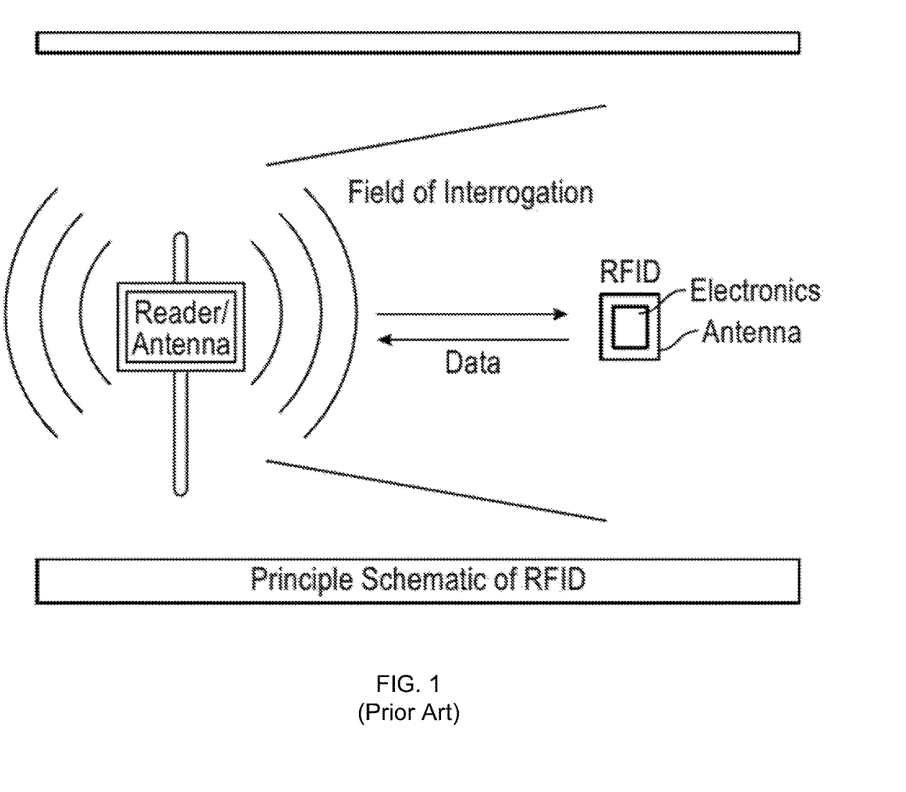
FIG. 1 is a simplified illustration showing a prior art radio frequency identification system.

Passive tags, as an example of battery-less identification marking technologies, operate without a battery source and offer low costs and interoperable communications with transmitters/readers, even though their technical limitations, such as a short range of communication from the tag to the reader (i.e. short read range or communication range). The lack of battery is indeed at the core of low passive tag costs. Passive RFID tags are, in essence, a coiled antenna connected to a circuit. The passive RFID tags make use of the magnetic energy of the incoming signal from the receiver to power a signal back to the receiver. FIG. 1 shows a typical communication of RFID receiver and tag. The battery-free characteristic of passive tags results in unit costs that range from a few cents to a few dollars. These unit costs are several orders of magnitude less than those of active (battery-powered) tags. This same battery-free characteristic also enables the physical design of tags in a large variety of shapes and sizes. For example, passive tags vary from flexible (similar to barcodes) to solid or encapsulated (similar to active tags). In addition to their low costs, the EPC UHF Generation 2 (or equivalent) standard guarantees the interoperability of passive tag and reader products. Virtually all passive products in the market are EPC UHF Generation 2 (or equivalent) compliant and hence interoperable. Thus, regardless of the manufacturer, the signal of any passive tag can be read and decoded by any reader and vice versa.

Despite the low costs and interoperability characteristics of passive RFID technologies, the need to keep passive tags and readers in very close proximity has historically limited their applicability. Indeed, a passive tag only emits in response to the reader signal (as opposed to active tags that continually emit beacon signals) and actually obtains its power from that signal. The reader signal is captured by the inductive coil antenna, which, at the same time, energizes the tag and supplies the power to respond back to the reader. Thus, passive tags emit weak signals and hence can only communicate with the reader if this is within a short communication range.

An automated and mobile identification and localization infrastructureless approach with a combination of active (battery assisted) RFID technologies and range-based algorithms is known. Even though the evident cost benefits of such, the actual upfront cost of active RFID tags (starting at $30 per unit) tremendously limits its actual application. Consumers of such approaches (contractors, defense, inventory management, supply chain, etc.) need to tag hundreds of thousands of items, each of them with a costly tag. In addition, in the previous approach, the antenna and receiver were placed in a mobile roving unit that must be able to circulate nearby the tagged components, so it can collect multiple unique signals for each tag, at the same time it collects the GPS position of the rover. Such ability to circulate close to any tagged component is often not possible at the expense of inaccurate location results. The aim of this previous active-RFID and mobile approach is to generate a unique location estimate (assumed as a stationary or non-moving condition) for all the tagged components with batch or discrete data collection efforts, i.e. without a real-time component. With this approach and given the (often) long physical distances between reader(s) and tags during the data collection in combination with the presence of obstacles and other signal attenuation issues affecting the signals traveling between distant reader(s) and tags, and even more when the components are spread in large areas and hence data collection efforts by roving units are minimized, there is no guarantee that a location can be estimated for all the tagged components, or that such location(s) can be accurate. Thus, the location of certain components is often lost and hence such components cannot be tracked. In any case, all that can be initially known from a tagged component is that it lies somewhere around the rover position in a radius equivalent to the communication range of the active radio frequency devices, typically in the range of hundreds to thousands of feet.

Corresponding reference characters indicate corresponding elements among the view of the drawings. The headings used in the figures do not limit the scope of the claims.

DETAILED DESCRIPTION

Figure 2:
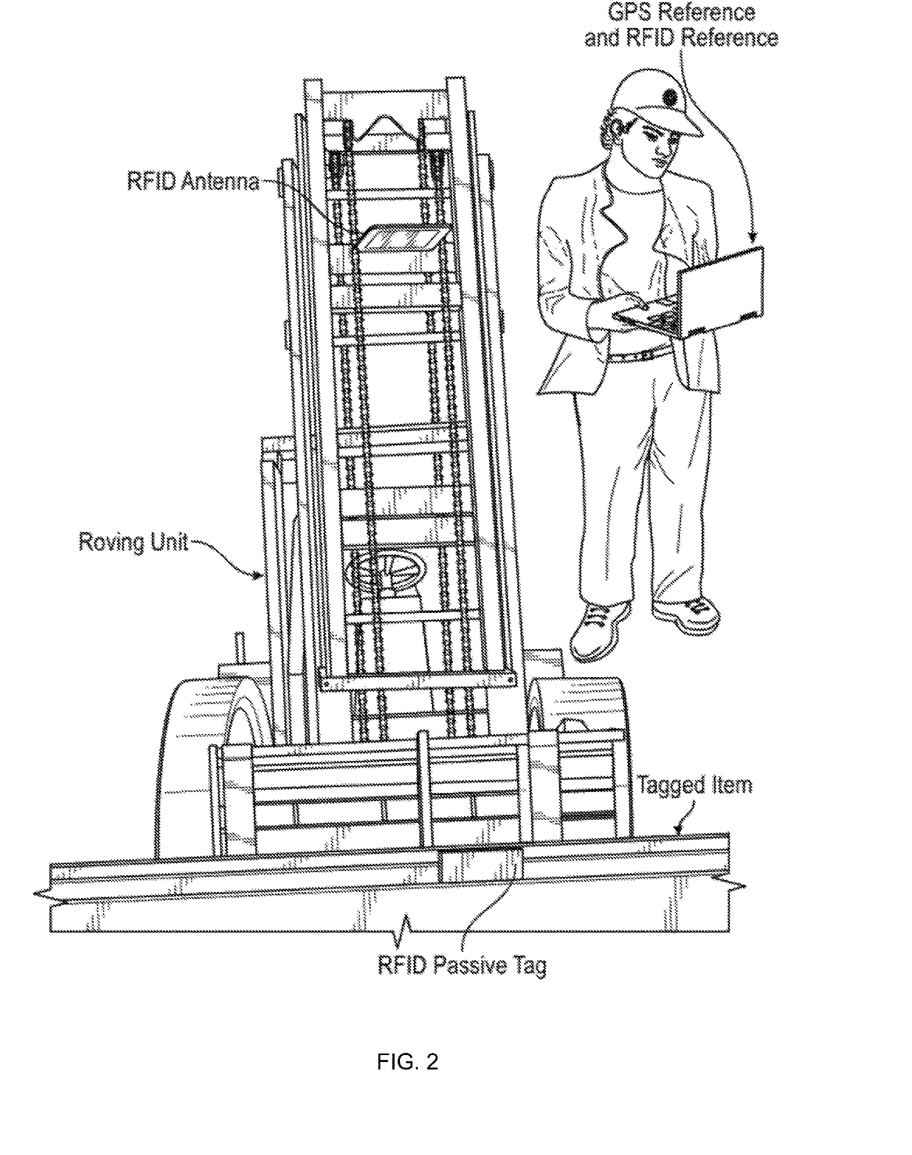
FIG. 2 is a picture showing passive tracking system.

Various embodiments of a passive tracking system for determining the exact location of a moved item tagged with a passive radio frequency identification (RFID) tag are disclosed. In some embodiments, the passive tracking system includes a roving agent that moves among a plurality of tagged items in which the roving agent includes a positioning reader (e.g. Global Positioning System) and radio frequency identification (RFID) transmitter/receiver (with antennas) co-located in the roving agent. In some embodiments, the roving agent is used to translocate (lift, handle, and/or direct the movement) of one or more items tagged with a passive RFID tag. In many embodiments, the roving agent may be a moving vehicle, such as a forklift or a crane, although in other embodiments, the roving agent may be a person, such as an equipment operator, driver, or an individual possessing a computing device, such as smart phone or portable computing device having position locating capability and an RFID antenna/receiver that allows for the determination of the position of a tagged item being moved as well as identify the moved tagged item. In some embodiments, an RFID transmitter/receiver is secured to the roving agent and its antenna specifically directed or not (depending on the type of antenna used) towards the roving agent that is going to handle the tagged items (for instance, the forks in case of the forklift) as illustrated in FIG. 2. At the same time, a battery-less identification-marking device, such as an inexpensive passive RFID tag, is physically attached to each tagged item. Each passive RFID tag 114 has a unique identification code, which is associated with the (commonly unique) piece mark of the tagged item (or pallet/group of tagged items). Given the short communication range of passive RFID tags 114, the RFID antenna/receiver 104 will only read the passive RFID tags of tagged items 112 near the location of the roving agent 102 (e.g. fork or hook for cranes). At a predefined interval (for instance 1 or 2 seconds), the positioning receiver, such as a GPS, computes the positional coordinates of the roving agent while the RFID antenna/receiver detects and identifies the nearby tagged item through its unique passive RFID tag.

Figure 3:
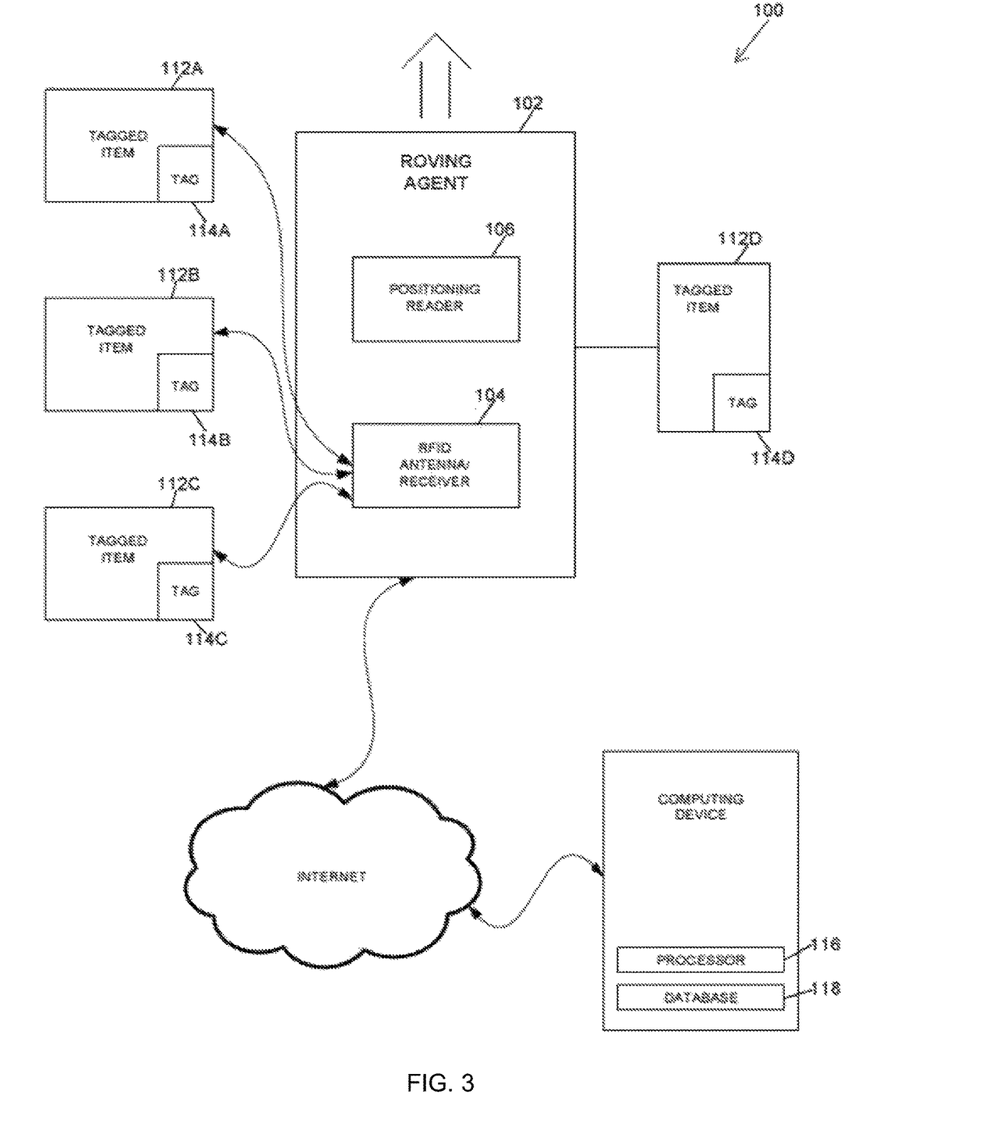
FIG. 3 is a simplified illustration showing the passive tracking system.

Referring to FIG. 3, a description of one embodiment of the passive tracking system, designated 100, is illustrated. The passive tracking system 100 utilizes the short communication range of the battery-less or passive RFID tag 114 associated with a particular tagged item 112 to guarantee that a tagged item(s) 112D being hauled by the roving agent 102 will be consistently identified over time and distance during translocation (between pick up and drop off) of the tagged item 112 by the roving agent 102, while those tagged items 112A-C positioned along and nearby the path of the roving agent 102 (but not hauled by the roving agent 102) will only be identified when in close-proximity to the roving agent 102 when the tagged item 112 is within the short communication range of the passive RFID tag 114 attached to the stationary tagged item 112A, 112B and 112C. This consistent identification of moved tagged items 112 during translocation of each tagged item 112 by the roving agent 102 is used to determine the final location of that tagged item 112, while discarding false stationary tagged item 112 positions, e.g. as a result of temporary stops by the roving agent 102 or the nearby presence of the RFID antenna/receiver 104 (collocated with the roving agent 102) in a stationary or semi-stationary mode. In some embodiments, the roving agent 102 may include a positioning reader 106, such as a GPS, that provides positional data of the roving agent 102 to a computing device 110 when a particular passive RFID tag 114 is detected. In some embodiments, the computing device 110 includes a processor 116 that receives the positional data of the roving agent 102 and the related identifying data of the detected passive RFID tag(s) 114 by the RFID antenna/receiver 104 of the roving agent 102. In some embodiments, the positional and identifying data of each detected tagged item 112 may be stored in a database 118 by the processor 116. In some embodiments, the database 118 may store the positional and identifying data of all the stationary tagged items 112 in inventory and then this location information for each tagged item 112 may be updated anytime the roving agent 102 moves one or more tagged items 112 from its original location to a new location. In this manner, the location of each tagged item 112 may be updated every time a tagged item 112 is moved from one location to another location by the roving agent 102.

In some embodiments, the computing device 110 may be a computer, such as a portable computer, tablet, or smart phone capable of receiving and storing positional and identifying information in a database. In some embodiments, the positioning reader 106 may be a GPS embodied in a mobile phone having GPS capability that is in operative communication with the computing device 110. In some embodiments, the roving agent 102 includes a transmitter (not shown) that transmits both the positional information from the positional reader 106 and identifying data of the detected passive RFID tag(s) 114 to the computing device 110 through the Internet and/or a wireless communication capability known in the art.

For instance, Table 1 shows an example in which three tagged items 112 (1, 2, and 3) are translocated over two coordinated locations by a roving agent 102. During the movement of the tagged items 112 by the roving agent 102 several other passive RFID tags 114 associated with tagged items 112 that are stationary and in proximity to the roving agent 102 may be detected and identified by the RFID antenna/receiver 104. Nonetheless, with the passive tracking system 100 there is the guarantee that only the tagged items 112 being moved by the roving agent 102 may be identified due to the limited range of communication (typically 5 feet or less) of the passive RFID tags 114 of the stationary tagged items 112 by the RFID antenna/receiver 104 associated with the roving agent 102. According to this reasoning, Tags 1, 2, and 3 are dropped at Position 7 at Time 7.

TABLE 1

| Logic Localization Reasoning | | | | | | | |
|---|---|---|---|---|---|---|---|
| Time 1 Position 1 | Time 2 Position 2 | Time 3 Position 3 | Time 4 Position 4 | Time 5 Position 5 | Time 6 Position 6 | Time 7 Position 7 | Time 8 Position 8 |
| Tag 1, 2, 3 | Tag 1, 2, 3, 10 | Tag 1, 2, 3, 10 | Tag 1, 2, 3, 23 | Tag 1, 2, 3, 25 | Tag 1, 2, 3 | Tag 1, 2, 3, 33 | Tag 33 |

The accuracy error of passive tracking system 100 is limited to the communication range of the passive RFID tags 114 (a few feet only). Indeed, field trials were used to validate such approach for two different types of passive RFID tags 114 with very accurate location results. Such results are provided in the Table 2.

TABLE 2

| | Straight line(m) | | Path(m) | | Distance error(m) | | 0-3 | 3-6 | 6-9 | >9 |
|---|---|---|---|---|---|---|---|---|---|---|
| | Avg | STDEV | Avg | STDEV | Avg | STDEV | (m) | (m) | (m) | (m) |
| Xefray | 12.94 | 1.86 | 18.42 | 2.16 | 4.53 | 1.34 | 20% | 73.33% | 6.67% | 0 |
| Troi 2 | 12.94 | 1.86 | 18.42 | 2.16 | 1.26 | 0.38 | 100% | 0 | 0 | 0 |

Figure 4A:
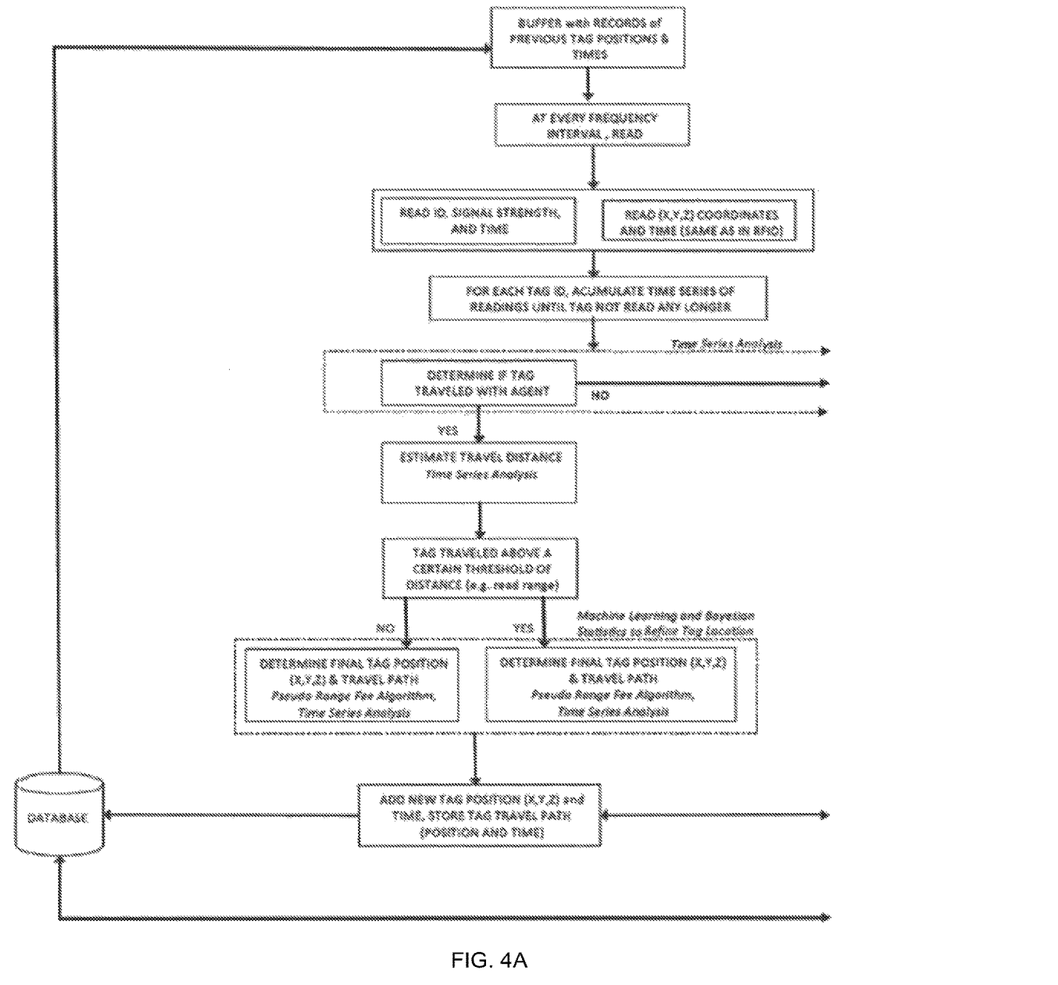
FIGS. 4A and 4B are two halves (FIG. 4A corresponding to the left half and FIG. 4B to the right half) of a flow chart illustrating one method of operation for the passive tracking system.
Figure 4B:
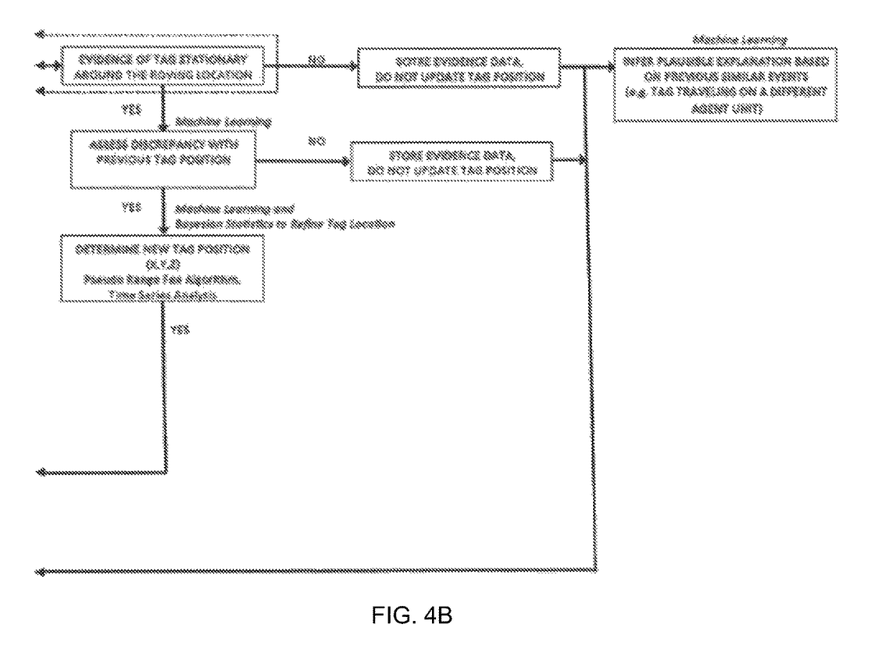

Referring to FIGS. 4A and 4B, one method of operation for the passive tracking system 100 is described. In some embodiments, the method utilizes a processor 116 (FIG. 3) to process information related to the readings of various passive RFID tags 114 (FIG. 3) is illustrated. The process may begin by a buffer being retrieved from the database 118 with a sequence of previous positions and times for one or more passive RFID tags 114 detected by a roving agent 102. A time is read for a given frequency of each passive RFID tag 114 detected within detection range of the roving agent 102. If the identification and signal strength from any passive RFID tag 114 is detected at a given time, the position of the roving agent 102 is also read at the exact same time and such position information is associated with the identification, signal strength, and time information. For a given passive RFID tag 114, the time series of signal strength and position information are accumulated. Once the same time identification signal is not detected any longer by the RFID antenna/receiver 104 in the roving agent 102, a time series analysis first determines whether the tag 114 was traveling with the roving agent 102. If the tag 114 had been traveling with the roving agent 102, the same time series analysis technique is used to assess the total travel distance. Pseudo range free algorithms in combination with the time series analysis are used by the processor 116 to compute the estimated final and current position of the detected tag 114, and the travel path to the from the start or origin position to the final position of the roving agent 102. A combination of Bayesian statistics and machine learning reasoning executed by the processor 116 aims at enhancing the accuracy of the final position estimate. Such Bayesian statistics and machine learning reasoning can become essentially different if the tag 114 has traveled above a certain threshold (e.g. several times the read range of the passive RFID tag 114) or not (e.g. below or about the read range of the identification tag). The same time-series analysis, pseudo range free algorithms, Bayesian statistics and machine learning are also executed by the processor 116 to ascertain the first tag 114 position, i.e. the origin of the travel path of the roving agent 102, so that such path can be computed. In either case, the new tag 114 position (X,Y,Z) is updated in the database 118 along with the corresponding time information. The travel path of tag 114 (time series of locations) from the original position to the final or current tag 114 position is also computed and stored in the database 118. If the tag 114 did not travel with the roving agent 102, evidence that the tag 114 was or was not stationary near the roving agent 102 is sought with time series analysis. If evidence that the tag 114 was actually stationary around the nearest location (for instance, based on signal strength) where the roving agent 102 identified the tag 114 exists, such location is compared with the previous position for the same tag 114 that the buffer initially retrieved from the database 118. If the location of the roving agent 102 where the tag 114 was identified and the previously recorded position for the same tag 114 in the database 118 are similar below a certain threshold of discrepancy (measured in distance, for instance below the tag 114 read range), then the previous recorded position is kept and the tag 114 position is not updated. Evidence of the identification of the tag 114 by the roving agent 102 is stored in the database 118 for potential future inferences, for instance by machine learning and Bayesian probability reasoning. On the contrary, if the location of the roving agent 102 where the tag 114 was identified and the previously recorded position for the same tag 114 in the database 118 are distant above the threshold of discrepancy, pseudo range free algorithms and time series analysis are used to estimate a new position for the tag 114. Bayesian statistics and machine learning executed by the processor 116 are used to improve the accuracy of the new estimated tag 114 position. The new tag 114 position is stored in the database 118 along with the corresponding time. In case the tag 114 was neither traveling with the roving agent 102 nor stationary—for example the tag 114 was actually moving with another roving agent 102, the time series of collected data (identification and location) are stored as future evidence and analyzed by machine learning to ascertain an explanation and also learn on how to make future inferences based on data from similar situations, then the identification and signal strength of each passive RFID tag 114 is read.

However, if the identification and signal strength is not read, then the location of the passive RFID tag 114 is read before proceeding further in the process. In addition, the passive RFID tags 114 that are potentially traveling with the roving agent 102 are estimated by the passive tracking system 100. The passive RFID tags 114 that were traveling, but are now stationary, are then determined by the processor 116. The buffer is then updated with the latest position and time for each passive RFID tag 114 before the buffer information is saved to a database 118. Bayesian statistics/machine learning then occurs based on the information provided before proceeding back to either further update the buffer with the latest time and position of each passive RFID tag 114 or update the buffer is again with the latest positions and times of each passive RFID tag 114 before the Bayesian statistics/machine learning is saved to the database 118. Once the information is saved, the process proceeds back to once again to retrieve a buffer from the database 118 with a sequence of positions and times for one or more passive RFID tags 114.

Process

In some embodiments, the processor 116 may execute instructions for the following method to effectuate the operation of the passive tracking system 100 discussed above.

```
COLLECTION OF RFID ID AND (X, Y, Z) POSITIONING DATA
Set STOP = False
ENTER Reading Frequency (integer, e.g. 1 second)
While STOP = False
-DATA COLLECTION - Read location, time, signal intensity and IDs-
WHEN ti+1 = ti + Reading Frequency
Read tag IDs (i.e. nearby roving unit) and corresponding RSSI
Read location coordinates (X, Y, Z)
END WHEN
END WHILE
FINAL AND INTERMEDIATE LOCATIONS ESTIMATION
- Assess moving and potentially moving tags-
FOR each ID discovered at ti+1
ID Count = ID Count + 1
   END FOR
   -Adjudicate tag position if tag was traveling with agent and is stored at
ti+1
   FOR each TAGID
   -tag was potentially traveling with agent
   IF TAGID Travel > threshold of minimum travel distance (e.g. 15ft)
      -Assess whether tag could have been stored
      IF TAGID not detected at ti+1
      -Determine actual tag position from time series of consecutive (X, Y, Z)
readings based on a minimum threshold of RSSI (PSEUDO RANGE
FREE APPROACH)
      SELECT (X, Y, Z) location before maximum or trend (RSSI) started to
decrease
      -Confirm that distance from (X, Y, Z) location at ti-n selected above to
latest (X, Y, Z) location at ti+1 is above a threshold
      IF not confirmed
      Use Bayesian statistics and machine learning to assess most likely
actual position (X, Y, Z) based on the combination of probability statistics
and past occurrences
         END IF
      -Assess whether component was actually moved from latest stored
position, e.g. that equipment was not idle
      IF distance between estimated actual position (X, Y, Z) at time t and
previous accepted position (X, Y, Z) at time t-n is larger than minimum
threshold
      -Use previous knowledge to refine position estimate. Use Bayesian
statistics and machine learning to identify patterns or trends in the location
estimate of the tag in order to use previous (and successful) reasoning
mechanisms
         UPDATE actual position to (X, Y, Z)
         UPDATE translocation path and time as a series of (X, Y, Z, t) values,
from initial to final positions
         ELSE
         KEEP previous stored position -do not update
         END IF
      END IF
      Assess tags not travelling with agent unit
      IF TAG was not travelling with agent unit
      Used time series analysis to determine whether tag was
stationary
         Assess if new position exists for stationary tag
         IF TAG was stationary
```

```
            -continued

Compare previous position with location where roving object detected it
         Compute new position
         IF DISCREPANCY in positions
         Compute new position with time series analysis, pseudo range-free
location algorithms, Bayesian statistics, and machine learning
         IF NOT
         Keep previous position - do not update
            IF TAG NOT STATIONARY
            Store evidence
      Use machine learning from previous instances to explain tag condition,
for instance tag passing by in a different roving unit
            END IF
         END IF
         END IF
         END FOR
   -Reset counter for tag IDs without discontinued identification at ti+1
   FOR each TAGID discovered at ti-n,..., ti but not identified at ti+1
      Tag ID Counter = 0
   END FOR
```

The process described above may include software instructions executed on a processor 116 in operative communication with the RFID antenna/receiver 104 of a roving agent 102 that travels through an area having a plurality of items 112 tagged with a respective passive RFID tag 114. The passive tracking system 100 makes inferences on the identified passive RFID tags 114 [those, if any, carried by the roving agent 102, and also those passive RFID tags 114, which are stationary (not moving) or non-stationary (e.g. as carried by another roving agent 102), nearby the path of the roving agent 102 at any moment in time, but not moved by the roving agent 102. By combining information on the series of passive RFID tags 114 identified over time and the corresponding positions of the roving agent 102 when a particular passive RFID tag 114 is detected. The process of the passive tracking system 100 makes use of pseudo-range free algorithms, time-series analysis, Bayesian statistics and machine learning to infer the most likely final location of the tagged items 112, as well as their travelling path, i.e. the multiple intermediate or non-stationary locations, to get to such final location coordinates of the tagged items 112. While the time-series analysis identifies the tagged items 112 actually being moved as opposed to the nearby tagged items 112 along the path of the roving agent 102, and inter travel distances, pseudo range-free location algorithm is designed to determine both the initial (before being moved) and final tag (after being moved) positions. The update on a tagged item 114 position is generated with the evidence that the tagged item 114 has been placed in the new position, i.e. in near real-time. Even though process executed by the processor 116 is in essence range free, i.e. algorithm does not directly infer distances or location from the intensity (RSSI) information, the process actually makes use of the intensity information (pseudo range-free algorithm) to decide what identification and positioning data for a particular tagged item 112 needs to be processed in order to increase the accuracy and certainty of the final (stationary) and intermediate (during translocation) tagged item 114 locations (X, Y, Z). Bayesian statistics and their belief functions and machine learning reasoning are used to refine and ascertain the likelihood of the final location of the tagged item 112 in a general manner, and in specific situations that increase the uncertainty and complexity of the location process. For example, short translocations of tagged items 112, below or about the tag 114 read range, can only be assessed using such probabilistic and reasoning approaches, and partially based on the learning from previous similar instances of events and/or feasibility tests.

Indeed, the Bayesian statistics and machine learning components aim at improving the degree of location accuracy for the new set of X,Y,Z coordinates, even more in certain type of situations that add uncertainty to the location process, and, even then, whether the likelihood of the new position in the event of previous history of true and false positives/negatives, and hence inclusive of the evaluation on the success, of previous similar type of assessments through machine learning. Time series analysis are also used to contrast the coordinates generated by the roving agent 102 when passing nearby a stationary (non-moving) tagged item 112 with the last known or recorded stationary coordinates of the same tagged item 112. Hence, any potential evidence of discrepancy in the final position of a tagged item 112, for instance in the case that the distance between a moving roving agent location when detecting a stationary item with a given communication range and the latest recorded position for the same tagged item 112 is multiple times such communication range, could be identified and immediately reported to trigger any corrective actions. In such case, the same combination of time series analysis, pseudo range-free algorithms, Bayesian statistics, and machine learning are also used to infer the new position of the stationary and tagged item. In case the tag 114 was neither traveling with the roving agent 102 nor stationary—for example the tag 114 was actually moving with another roving agent 102, the time series of collected data (identification and location) are stored as future evidence and analyzed by machine learning to ascertain an explanation and also learn on how to make future inferences based on data from similar situations.

The advantages of the passive tracking system 100 are the following:

1. Large benefit to cost ratio. Inexpensive battery-less identification marking technologies, such as passive RFID tags 114, even though with a much shorter communication range, can be used to track tagged items 114 with the passive RFID system 100. The cost of each passive RFID tag 114 ranges from cents to a few dollars, and hence allows the approach to be much more cost effective.

2. Precise location. While the previous mobile approach with active RFID results in location accuracies that range from a few feet to 30 or 50 feet, the passive tracking system 100 implemented through passive RFID technology consistently results in reduced location errors, as shown in the table above. Partially, this advantage comes from the computation of the location of the tagged item 112 without the computation of any signal characteristic but with its consideration (pseudo range-free approach). Thus, the computing approach is much simpler and, at the same time, robust to the unpredictability common to open field scenarios. For instance, war zones, civil projects, or distribution areas are characterized by the presence of large moving obstacles, such as tanks, construction equipment, cars, containers, etc., variable weather conditions, or the presence of materials (wood, liquids) with properties that can significantly attenuate electromagnetic and radio waves.

3. Passive RFID approaches are interoperable. As such, there is a standard of communication that allows tags, readers, and antennas from different suppliers to communicate with each other; however, such standard does not exist for active RFID tags, implying that a company willing to embrace active RFID is actually betting on the products to be deployed and on the survival of the manufacturer or provider of such products. The adoption of active RFID implicitly brings a risk associated with the adopted product.

4. Use of an infrastructure-less tracking approach. As a difference with indoor localization systems (for instance Real Time Location Systems or RTLS), in most unstructured environments the utilization of a stationary infrastructure (stationary antennas, poles, receivers, power and communication cables) would obstruct the processes or operations, and hence it is not an option. In addition, such stationary infrastructure results in prohibitive costs when implemented over extensive or large areas such as war zones, construction projects, inventory areas, or distribution areas.

5. When compared to the existing active RFID approach, the passive tracking system becomes extremely much more efficient, since, essentially, a component is only tracked when it is being moved. In the conventional active RFID approach, the current practice is to track the stationary (even though such stationary condition is not guaranteed) location of all (frequently thousands of) tagged items 112 several times a day.

6. Thus, the main difference, from a conceptual perspective, is that the location and identification tracking approach of the passive tracking system 100 is embedded into the process that moves, hauls, or transports the tagged items 112, and that such tracking is limited to the moment when the tagged item 112 is left in its final position. Previous approaches (both manual and with active RFID) were based on that the localization and identification approach had to be performed on the stationary condition of the tagged items, i.e. separately from the process of changing the location (or moving) the tagged items 112. Thus, a tagged item 112 could be changed from one location to another location, and, if new data had not been collected since such movement, the localization records of the tagged item 112 would reflect its old position and hence the tagged item 112 would likely not be located. Thus, the previous approaches aim at routinely tracking all the stationary tagged items 112 in order to generate a single estimate of the stationary location for all the tagged items 112. In the passive tracking system 100, a tagged item 112 is only tracked when it is translocated from a position to a different (or eventually the same) position, and location estimates are generated not only for its final or stationary location but also for its multiple sequence of intermediate or non-stationary locations during the movement.

7. Near real-time and continuous update of positions. A new final position is generated immediately after (e.g. a few seconds) the identification reader in the roving agent 102, which has positioned the tagged items 112 in its final location, moves away from the tagged items 112 and eventually loses contact with the corresponding tag. In this passive-identification and mobile approach of the passive tracking system 100, the positions of the tagged items 112 are continuously updated as the tagged items 112 are moved, in near real-time. In the conventional active RFID approach, data is collected for all the tagged items 112 at a predefined frequency, i.e. in a batch mode, and hence there is no real-time visibility of the actual tagged item 112 positions. In such discrete and batch data collection mode, the positions of the tagged items 112 age with increments in the time intervals between data collection efforts. For instance, a one-time-a-week data collection effort implies that positions are 7-day old right before each data collection effort.

8. Highly accurate and reliable location estimation based on proximity reasoning. The short distance(s) between the identification reader in the roving agent and the tagged items 112 being hauled by the roving agent 102 virtually guarantees (for instance with the exception of hardware malfunctioning issues) that location estimates can be generated by the translocated components. In the conventional RFID-active mobile approach, given the (often) long physical distances between reader(s) and tags during the data collection in combination with the presence of obstacles and other signal attenuation issues affecting the signals traveling between distant reader(s) and tags, and even more when the tagged items 112 are spread in large areas and hence data collection efforts by roving units are minimized, there is no guarantee that a location can be estimated for all the tagged items 112, or that such location can be accurate. Thus, the location of certain tagged items 112 is often lost and hence such tagged items 112 cannot be tracked. On the contrary, the passive tracking system 100 virtually guarantees not only the location of a tagged item 112, but also that such location is nearly identical to the actual tagged item 112 position. In addition, the passive tracking system 100 also contrasts the coordinates generated by the roving agent when passing nearby a stationary (non-moving) tagged item 112 with the last known or recorded stationary coordinates of the same tagged item 112. Hence, any potential evidence of discrepancy in the final position of a tagged item 112, for instance in the case that the distance between a moving roving agent location when detecting a stationary tagged item 112 with a 10 ft communication range and the latest recorded position for the same tagged item is larger than such communication range, could be identified and immediately reported to trigger any corrective actions.

9. The passive tracking system 100 enables the efficiency assessment for the processes associated with the movement/translocation/hauling of resources/components/items. On top of the ability to provide the stationary or final location of tagged items 112, the passive tracking system 100 also provides the non-stationary locations during the translocation of a tagged item 112 and hence enables the efficiency assessment of the processes associated with such translocation. For instance, in car inventory management, the efficiency of the inventory process can be observed by analyzing the translocation data, such as the average number of times a car has been moved, the length (in distance and/or time) of such movements, paths of movement, or the amount of time required to retrieve and deliver a solicited car unit. Conventional automated and mobile identification and localization infrastructureless active-RFID approaches only provide stationary tagged item 112 data and hence translocation operations are not visible and, as a result, their efficiency cannot be assessed.

10. A novel pseudo range-free localization reasoning approach is used to estimate final (stationary) and intermediate (non-stationary) positions. Conventional RFID-active approaches to localization of stationary assets depend on either triangulation or time-of-flight mechanisms for infrastructure-based approaches (e.g. RTLS), most of them range based, or optionally, range free. Indeed, existing approaches to track locations are mostly based on algorithms that make use of RSSI (intensity of the RFID tag signal as captured by a receiver) information to infer distances between an identification tag and receiver(s), and hence estimate the tag location, i.e. range based, or eventually that do not make use of the RSSI intensity data at all, i.e. range free. As a departure from current reasoning algorithms, the localization approach of the passive tracking system 100 is pseudo range free. Thus, even though it does not make use of the signal intensity data to infer distances or locations, it dynamically sets a minimum RSSI threshold value in order to select the signals from a specific tag that will be used to estimate the location of the corresponding tagged item with the final goal to improve the accuracy of such location. The stronger the RSSI signal is, the more certain the proximity between the tagged item and the antenna becomes. On the opposite, that a signal is weak does not necessary imply that antenna and tagged item are distant from each other, they could actually be next to each other or distant; there is no certainty. Thus, supported by machine learning and Bayesian statistic reasoning, the RSSI threshold value is used to improve the estimated location accuracy of the tagged item without loosing granularity or data collection evidence. For example, the minimum signal intensity threshold value may be set to a strong intensity value for determining the location of a tagged item for which multiple signals have been collected, but a weak intensity threshold may be set when the number of data points is scarce. Thus, the pseudo range-free algorithm does not use the signal strength to infer distances or locations but such RSSI intensity is dynamically set and leveraged to improve the accuracy of the estimated locations. Eventually, though, the pseudo-range free algorithm could process all the signals from a given tag irrespective of their intensity, e.g. in the case that such signals were all above the predefined threshold of intensity. In such case, the pseudo-range free algorithm would be conceptually equivalent to a range-free approach.

The passive tracking system 100, though, is characterized by the following traits:

The localization and identification process of the passive tracking system 100 is embedded in the operations and processes that translocate the tagged items 112 and enables the assessment of efficiency on such operations. Thus, if a tagged item 112 is translocated, new data may be collected. If the component is not moved, its position record will not change. There is always a correspondence between the component position and its localization records. There is no need to run repetitive localization and identification efforts for all the (stationary) tagged items 112. Assuming that the tagged items 112 need to be moved by a machine (forklift) or even manually, such machine or person agent will automatically provide the collection for the data that will result in the new localization of the tagged item 112.

The passive tracking system 100 can be used to track resources or components in an inexpensive manner using passive RFID technology. The passive tracking system 100 can be applied to any situation in which a large number of tagged items 112 must be managed and tracked in order for the right tagged item 112 to be instantaneously located, so that it can be retrieved to the right location and at the right time.

The passive tracking system 100 focuses on tracking the process of moving tagged items 112 as opposed to tracking the tagged items 112. In some embodiments, the passive tracking system 100 determines location estimates based on a proximity approach as opposed to conventional active RFID tracking solutions that utilize triangulation and other similar algorithms to determine location based on multiple readings from the same component to a fixed network of antennas to provide an accurate location estimate.

The passive tracking system 100 may enhance the identification and localization of non-bulk resources and items in dynamic and/or unpredictable environments with a reduced upfront and maintenance cost. Industries that may want to make use of this approach include:

Civil engineering and construction projects.
Inventory or distribution management, e.g. in the car industry.
Logistics, both indoors and outdoors.
Manufacturing.
Defense (specifically logistics and war scenarios) for material and cargo supplies.
Supply chain management.

Such identification and localization may be useful, in regards to the tagged items, to:
Track tagged items.
Operate and maintain items (for instance, valve components in industrial facilities).
Distribute items.
Assess the efficiency of processes (e.g. inventory, distribution, supply chain, construction, manufacturing, etc.).

The benefits of passive tracking system 100 include cost and availability of technology is as follows:

COST and AVAILABILITY OF TECHNOLOGIES. Active RFID technologies are proprietary since there is no standard of communication between tags and readers, and come to an expensive cost. At a minimum, each active tag is about $30, ranging up to $100 and more per unit. On the other hand, most, if not all, passive technologies are interoperable (EPC Generation 2 or equivalent standard), which means that virtually any reader can communicate with any tag, despite the manufacturer. There are hundreds of passive manufacturers, as opposed to a few active manufacturers. Passive tags costs range from tens of cents per unit to a few dollars (e.g. $5) per unit. Higher prices drop rapidly with order sizes.

TRACKING MOVEMENT. The passive tracking system 100 tracks the multiple and final location of the specific tagged items 112 being moved as opposed to a single location for all the existing components. All existing indoor and outdoor dynamic tracking approaches (that do not rely on stationary gates or antennas) require to scan a complete scenario in order to determine a single position of the tags via triangulation or similar type of algorithms. In the passive tracking system 100, the multiple locations of a tagged item 112 are measured when the tagged item 112 is actually being moved. In other words, the tagged items 112 being moved are only tracked as opposed to tracking all the tagged items 112 (at all data collection efforts). For each movement, all the locations of the specific tagged item 112(s) are being tracked and estimated as opposed to a single location for all the tagged items 112. Thus, there is a significant minimization of the effort, technology resources, complexity, and cost required to determine new tagged item 112 positions.

EFFICIENCY. When compared to the existing active RFID approach, the passive tracking system 100 becomes extremely more efficient, since, essentially, a tagged item 112 is only tracked when it is being moved. In the conventional active RFID approach, the current practice is to track the location of all (frequently thousands of) components one or more times a day.

PROXIMITY BEHAVIOR. The passive tracking system 100 relies on very short communication ranges from passive radio frequency devices, with signals traveling a few feet between reader and tag, and vice versa. In alternative tracking approaches that all use active technologies, the larger the communication range, the better these approaches work. Longer ranges, up to 1,000 and more feet, represent an opportunity to track more components at any given time, given that readers can capture signals from distant components and process them into positions. With a large read range, such as that of active tracking systems, the proposed passive RFID approach would not be feasible. On the contrary, in this passive RFID approach of the passive tracking system 100, a fundamental characteristic is that for a component to be tracked, such component must be nearby the agent. Thus, in the passive tracking system 100 read ranges should not exceed a few feet. Actually, preliminary experiments have proven that, the shorter the read range, the more accurate the position results. In this innovation, the approach is based on proximity behavior. If there is proximity, there is identification, but if there is no proximity, there cannot be identification in the passive tracking system 100.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A passive tracking system comprising:
    a roving agent having a radio frequency identification receiver, the roving agent being operable for moving one or more tagged items from a first location to a second location;
    a passive radio frequency identification tag associated with each respective one or more tagged items being moved from the first location to the second location by the roving agent, the passive radio frequency identification tag being detected by the radio frequency identification receiver when located on the roving agent; and
    a positional receiver associated with the roving agent and synchronized with the passive radio frequency identification receiver of the roving agent; and
    a processor having access to data combined from the radio frequency identification receiver and the positional receiver, the processor being configured to, in real-time:
        analyze translocation data including a set of position coordinates defining locations of the one or more tagged items, the translocation data further including signal intensity data associated with the one or more tagged items at each of the locations,
        dynamically select specific ones of the locations where the signal intensity data meets a predetermined minimum threshold value of signal intensity,
        infer a likelihood of a predetermined location of the one or more tagged items based on the translocation data associated with the specific ones of the locations,
        continuously collect data associated with translocation of the one or more tagged items from one location to another, the data including information about movement of the roving agent at any given time, and
        identify one or more patterns or trends, or insights through analysis of the translocation data in order to increase efficiency of an operation being passively tracked by the passive tracking system.

2. The passive tracking system of claim 1, wherein the first location of the roving agent is when the respective one or more of the tagged items is first located on the roving agent and the second location of the roving agent is when the respective one or more of the tagged items is no longer located on the roving agent.

3. The passive tracking system of claim 2, wherein the predetermined location includes a final location or an intermediate location.

4. The passive tracking system of claim 1, wherein the processor is in operative communication with the radio frequency identification receiver for identifying which passive radio frequency identification tags are traveling with the roving agent.

5. The passive tracking system of claim 4, wherein the processor executes instructions for determining which of the passive radio frequency identification tags are traveling with the roving agent and which of the passive radio frequency identification tags are stationary and not traveling with the roving agent.

6. The passive tracking system of claim 4, further comprising a database in operative communication with the processor, the database including data related to the position of each respective one or more passive radio frequency identification tags.

7. The passive tracking system of claim 1, wherein the processor executes instructions in which the position of a respective one or more passive radio frequency identification tags in the database is updated when detected by the radio frequency identification receiver.

8. The passive tracking system of claim 7, wherein the position of the respective one or more passive radio frequency identification tags is the position of the roving agent when the respective one or more passive radio frequency identification tags is detected by the radio frequency identification receiver.

9. The passive tracking system of claim 1, wherein the radio frequency identification receiver is operable to detect one or more passive radio frequency identification tags when in close proximity to the roving agent and not located on the roving agent.

10. The passive tracking system of claim 1, wherein each of the one or more passive identification tags is battery-less.

11. The passive tracking system of claim 1, wherein the positional reader comprises a global positioning system.

12. A processor for passively tracking an operation, configured to:
  access translocation data combined from a radio frequency identification receiver associated with a roving agent and a positional receiver;
  analyze translocation data including identifying a set of position coordinates defining locations of one or more tagged items, the translocation data further including signal intensity data associated with the one or more tagged items at each of the locations;
  dynamically select specific ones of the locations where the signal intensity data meets a predetermined minimum threshold value of signal intensity;
  infer a likelihood of a predetermined location of the one or more tagged items based on the translocation data associated with the specific ones of the locations;
  continuously collect data associated with translocation of the one or more tagged items from one location to another, the data including information about movement of the roving agent at any given time;
  and
  identify one or more patterns or trends, or insights through analysis of the translocation data in order to increase efficiency of the operation being passively tracked.

13. The processor of claim 12, wherein the predetermined location includes a final location or an intermediate location of the one or more tagged items.

* * * * *